US009289852B2

(12) United States Patent
Luedi et al.

(10) Patent No.: US 9,289,852 B2
(45) Date of Patent: Mar. 22, 2016

(54) LASER PROCESSING MACHINE, LASER CUTTING MACHINE, AND METHOD FOR ADJUSTING A FOCUSED LASER BEAM

(71) Applicant: Bystronic Laser AG, Niederoenz (CH)

(72) Inventors: Andreas Luedi, Burgdorf (CH); Daniel Cathry, Roethenbach bei Herzogenbuchsee (CH)

(73) Assignee: Bystronic Laser AG, Niederoenz (CH)

( * ) Notice: Subject to any disclaimer, the term of this patent is extended or adjusted under 35 U.S.C. 154(b) by 356 days.

(21) Appl. No.: 13/947,060

(22) Filed: Jul. 20, 2013

(65) Prior Publication Data

US 2013/0334181 A1    Dec. 19, 2013

Related U.S. Application Data

(63) Continuation-in-part of application No. PCT/IB2012/050119, filed on Jan. 10, 2012.

(60) Provisional application No. 61/674,276, filed on Jul. 20, 2012, provisional application No. 61/436,717, filed on Jan. 27, 2011.

(30) Foreign Application Priority Data

Jan. 27, 2011  (EP) ..................................... 11152317
Jul. 20, 2012  (EP) ..................................... 12177388

(51) Int. Cl.
*B23K 26/04* (2014.01)
*B23K 26/38* (2014.01)
(Continued)

(52) U.S. Cl.
CPC ........... *B23K 26/0626* (2013.01); *B23K 26/026* (2013.01); *B23K 26/04* (2013.01);
(Continued)

(58) Field of Classification Search
CPC ........ B23K 26/04; B23K 26/14; B23K 26/38; B23K 26/42
USPC .............. 219/121.62, 121.67, 121.73, 121.81
See application file for complete search history.

(56) References Cited

U.S. PATENT DOCUMENTS

| 3,423,593 A | 1/1969 | Chinnock |
| 3,590,840 A | 7/1971 | Hyer |

(Continued)

FOREIGN PATENT DOCUMENTS

| CN | 201220326 Y | 4/2009 |
| DE | 8710866 U1 | 12/1988 |

(Continued)

OTHER PUBLICATIONS

Written Opinion of the International Search Authority International Preliminary Report on Patentability, dated May 7, 2012, from parent PCT/IB2012/050119, translated into English translation.

(Continued)

*Primary Examiner* — Samuel M Heinrich

(74) *Attorney, Agent, or Firm* — George Kapsalas; Patentbuero Paul Rosenich AG

(57) ABSTRACT

Laser processing machines and methods for adjusting focused laser beams. Laser processing heads have nozzle with openings admitting primary laser beam. An orientation device is included, as well as at least one sensor to mutually center primary beam and opening of nozzle. A first beam handling unit is arranged near the nozzle opening and may convert primary beam into a secondary wide-band heat beam, and then may emit this secondary beam towards a sensor; or may reflect/scatter at least a portion of the primary beam towards sensor. The sensor detecting the converted secondary beam is arranged within the laser processing head. In an adjustment process, a primary beam may be converted into a wide-band heat radiation as secondary radiation at the beam handling unit, and emitted and/or diverted into a scattered/reflex beam towards the sensor. Respective position of nozzle opening center and primary beam is calculated from sensor-measured values, and nozzle center and beam center are automatically displaced to mutual center. The axial position of beam focus may be also be measured and set via the nozzle centering procedure.

20 Claims, 7 Drawing Sheets

(51) Int. Cl.
  *B23K 26/06* (2014.01)
  *B23K 26/02* (2014.01)
  *B23K 26/073* (2006.01)

(52) U.S. Cl.
  CPC ............ *B23K 26/042* (2015.10); *B23K 26/043* (2013.01); *B23K 26/073* (2013.01); *B23K 26/1462* (2015.10); *B23K 26/38* (2013.01)

(56) References Cited

U.S. PATENT DOCUMENTS

| | | | |
|---|---|---|---|
| 3,736,402 A | 5/1973 | Mefferd et al. |
| 3,843,865 A | 10/1974 | Nath |
| 4,335,296 A | 6/1982 | Bredow |
| 4,406,940 A | 9/1983 | Tsutsumi |
| 4,427,873 A | 1/1984 | Orita et al. |
| 4,634,832 A | 1/1987 | Martyr |
| 4,644,128 A | 2/1987 | Palentyn et al. |
| 4,668,088 A | 5/1987 | Quinque et al. |
| 4,675,501 A | 6/1987 | Klingel |
| 4,698,480 A | 10/1987 | Klingel |
| 4,806,726 A | 2/1989 | Rosa et al. |
| 4,940,880 A | 7/1990 | Klingel et al. |
| 4,950,861 A | 8/1990 | Erlenmaier et al. |
| 5,008,510 A | 4/1991 | Koseki |
| 5,039,836 A | 8/1991 | Lemelson |
| 5,045,668 A | 9/1991 | Neiheisel et al. |
| 5,132,510 A | 7/1992 | Klingel et al. |
| 5,304,773 A | 4/1994 | Kilian et al. |
| 5,371,336 A | 12/1994 | Albert et al. |
| 5,373,135 A | 12/1994 | Beyer et al. |
| 5,463,202 A * | 10/1995 | Kurosawa ............. B23K 26/032 219/121.62 |
| 5,463,215 A | 10/1995 | Alfille |
| 5,491,318 A | 2/1996 | Sugawara et al. |
| 5,525,776 A | 6/1996 | Okamoto |
| 5,548,098 A | 8/1996 | Sugawara et al. |
| 5,667,707 A | 9/1997 | Klingel et al. |
| 5,685,999 A | 11/1997 | Wiedemann et al. |
| 5,698,120 A | 12/1997 | Kurosawa et al. |
| 5,751,436 A | 5/1998 | Kwon et al. |
| 5,886,319 A | 3/1999 | Preston et al. |
| 5,915,316 A | 6/1999 | Tajima et al. |
| 5,968,382 A | 10/1999 | Matsumoto et al. |
| 5,969,335 A | 10/1999 | Karasaki |
| 5,998,768 A | 12/1999 | Hunter et al. |
| 6,044,308 A | 3/2000 | Huissoon |
| 6,124,565 A | 9/2000 | Morishita et al. |
| 6,188,041 B1 | 2/2001 | Kim et al. |
| 6,204,473 B1 | 3/2001 | Legge |
| 6,260,976 B1 | 7/2001 | Endou et al. |
| 6,284,999 B1 | 9/2001 | Virtanen et al. |
| 6,288,363 B1 | 9/2001 | Kaga et al. |
| 6,300,592 B1 | 10/2001 | Ulrich et al. |
| 6,316,743 B1 | 11/2001 | Nagahori et al. |
| 6,326,586 B1 | 12/2001 | Heyerick et al. |
| 6,376,798 B1 | 4/2002 | Remue et al. |
| 6,392,192 B1 | 5/2002 | Cole et al. |
| 6,393,687 B1 | 5/2002 | Friedrich |
| 6,417,487 B2 | 7/2002 | Nagura et al. |
| 6,419,146 B1 | 7/2002 | Buldhaupt et al. |
| 6,455,807 B1 | 9/2002 | Scott |
| 6,462,301 B1 | 10/2002 | Scott et al. |
| 6,528,762 B2 | 3/2003 | Mayer |
| 6,588,738 B1 | 7/2003 | Sukuvaara et al. |
| 6,649,866 B2 | 11/2003 | Reichmann et al. |
| 6,670,574 B1 | 12/2003 | Bates et al. |
| 6,693,256 B2 | 2/2004 | Furujo et al. |
| 6,777,641 B2 | 8/2004 | Cole et al. |
| 6,777,646 B2 | 8/2004 | Schubert |
| 6,822,187 B1 | 11/2004 | Hermann et al. |
| 6,833,911 B2 | 12/2004 | Lizotte |
| 6,886,284 B2 | 5/2005 | Lizotte |
| 6,934,014 B2 | 8/2005 | Kleinhuber |
| 7,005,606 B2 | 2/2006 | Legge et al. |
| 7,038,166 B2 | 5/2006 | Denney et al. |
| 7,060,932 B2 | 6/2006 | Denney et al. |
| 7,124,420 B2 | 10/2006 | Murata et al. |
| 7,180,920 B2 | 2/2007 | Denney et al. |
| 7,286,223 B2 | 10/2007 | Denney et al. |
| 7,289,206 B2 | 10/2007 | Denney et al. |
| 7,345,257 B2 | 3/2008 | Yamazaki et al. |
| 7,379,483 B2 | 5/2008 | Denney et al. |
| 7,492,453 B2 | 2/2009 | Denney et al. |
| 7,505,504 B2 | 3/2009 | Sakai et al. |
| 7,528,344 B2 | 5/2009 | Horn et al. |
| 7,570,443 B2 | 8/2009 | Blasenheim et al. |
| 7,620,085 B2 | 11/2009 | Denney et al. |
| 7,864,315 B2 | 1/2011 | Denney et al. |
| 7,880,114 B2 | 2/2011 | Denney et al. |
| 7,880,877 B2 | 2/2011 | Denney et al. |
| 8,040,619 B2 | 10/2011 | Blasenheim et al. |
| 8,094,303 B2 | 1/2012 | Denney et al. |
| 8,217,301 B2 | 7/2012 | Schmauder et al. |
| 8,228,501 B2 | 7/2012 | Denney et al. |
| 8,258,425 B2 | 9/2012 | Denney et al. |
| 8,306,079 B2 | 11/2012 | Denney et al. |
| 8,314,361 B2 | 11/2012 | Harnisch et al. |
| 8,383,980 B2 | 2/2013 | Yamazaki et al. |
| 8,439,811 B2 | 5/2013 | Erlenmaier et al. |
| 8,519,299 B2 | 8/2013 | Schmauder et al. |
| 8,624,158 B2 | 1/2014 | Denney et al. |
| 8,638,509 B2 | 1/2014 | Blasenheim et al. |
| 2003/0014895 A1 | 1/2003 | Lizotte |
| 2003/0183608 A1 | 10/2003 | Yamazaki et al. |
| 2003/0234242 A1 | 12/2003 | McCoy |
| 2003/0234243 A1 | 12/2003 | McCoy |
| 2003/0234244 A1 | 12/2003 | McCoy |
| 2004/0027630 A1 | 2/2004 | Lizotte |
| 2004/0182839 A1 | 9/2004 | Denney et al. |
| 2004/0182840 A1 | 9/2004 | Denney et al. |
| 2004/0182841 A1 | 9/2004 | Denney et al. |
| 2004/0182842 A1 | 9/2004 | Denney et al. |
| 2004/0182998 A1 | 9/2004 | Denney et al. |
| 2004/0182999 A1 | 9/2004 | Denney et al. |
| 2004/0208212 A1 | 10/2004 | Denney et al. |
| 2005/0040150 A1 | 2/2005 | Denney et al. |
| 2005/0051523 A1 | 3/2005 | Legge et al. |
| 2005/0213881 A1 | 9/2005 | Leclerc et al. |
| 2006/0144834 A1 | 7/2006 | Denney et al. |
| 2007/0119829 A1 | 5/2007 | Vietz et al. |
| 2007/0193988 A1 | 8/2007 | DeVerclos et al. |
| 2007/0228025 A1 | 10/2007 | Horn et al. |
| 2008/0031298 A1 | 2/2008 | Sakai et al. |
| 2008/0067331 A1 | 3/2008 | Denney et al. |
| 2009/0001063 A1 | 1/2009 | Weick et al. |
| 2009/0021731 A1 | 1/2009 | Denney et al. |
| 2009/0057283 A1 | 3/2009 | Schmauder et al. |
| 2009/0181838 A1 | 7/2009 | Schmauder et al. |
| 2009/0284739 A1 | 11/2009 | Denney et al. |
| 2010/0071220 A1 | 3/2010 | Thompson et al. |
| 2010/0134628 A1 | 6/2010 | Pfitzner et al. |
| 2010/0188669 A1 | 7/2010 | Rushford |
| 2011/0102789 A1 | 5/2011 | Denney et al. |
| 2011/0266262 A1 | 11/2011 | Denney et al. |
| 2012/0228274 A1 | 9/2012 | Schmauder et al. |
| 2013/0068738 A1* | 3/2013 | Schurmann ............. B23K 26/38 219/121.72 |
| 2013/0319980 A1* | 12/2013 | Hesse ................... B23K 26/032 219/121.73 |
| 2015/0069028 A1* | 3/2015 | Jennings ............. B23K 26/0066 219/121.73 |

FOREIGN PATENT DOCUMENTS

| | | |
|---|---|---|
| DE | 4201640 C1 | 2/1993 |
| DE | 10150129 C1 | 4/2003 |
| DE | 102007013623 A1 | 10/2008 |
| DE | 102007048471 A1 | 4/2009 |
| DE | 102009044751 A1 | 6/2010 |
| EP | 0597771 A1 | 5/1994 |
| EP | 0680805 B1 | 1/2001 |
| EP | 1561538 A1 | 8/2005 |
| EP | 1600248 A2 | 11/2005 |

(56) References Cited

FOREIGN PATENT DOCUMENTS

| EP | 1693141 A2 | 8/2006 |
| EP | 1693141 A3 | 7/2008 |
| EP | 1967316 A1 * | 9/2008 |
| EP | 1600248 A3 | 10/2008 |
| EP | 2243557 A1 | 10/2010 |
| JP | S56-041092 A | 4/1981 |
| JP | H03-027889 A | 2/1991 |
| JP | H07-144289 A | 6/1995 |
| JP | H09-076084 A | 3/1997 |
| JP | H10-249566 A | 9/1998 |
| JP | H11-077356 A | 3/1999 |
| JP | 2009-129513 A | 6/2009 |
| WO | 2008/052591 A1 | 5/2008 |
| WO | 2011/035888 A1 | 3/2011 |
| WO | 2012/101533 A1 | 8/2012 |
| WO | 2012/101533 A4 | 9/2012 |

OTHER PUBLICATIONS

International Search Report and International Preliminary Report on Patentability, dated May 7, 2012, from parent PCT/IB2012/050119; in German, with partial translation.

EPO Search Report and Written Opinion, from priority appl.No. EP11152317; dated Jul. 8, 2011; in German.

EPO Search Report and Written Opinion, dated Dec. 6, 2012, from priority appl.No. EP1217388 of the present U.S. Appl. No. 13/947,060; in German.

Copending U.S. application nationalization of related parent PCT application, U.S. Appl. No. 13/981,090.

Copending related U.S. Appl. No. 13/952,571 is continuation (CON) of parent PCT application PCT/IB2012/050119.

* cited by examiner

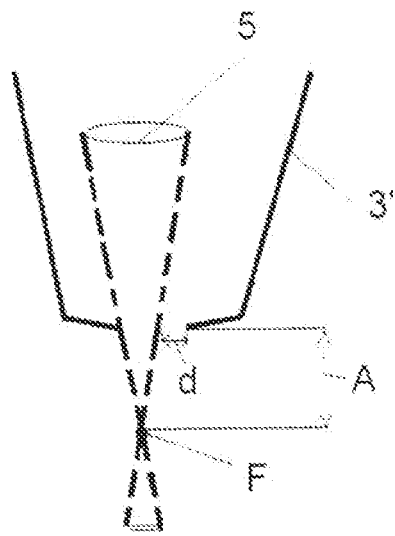
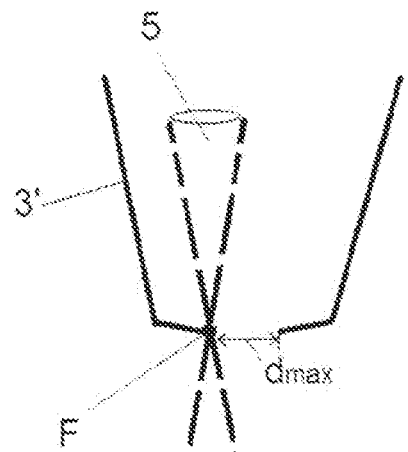
FIG. 4A  FIG. 4B
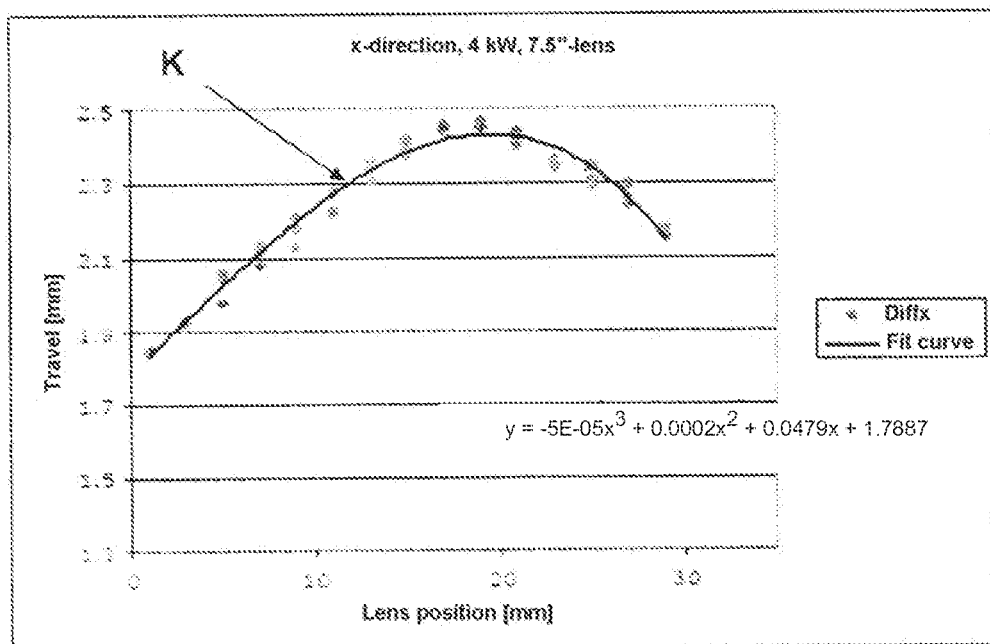
FIG. 5

LASER PROCESSING MACHINE, LASER CUTTING MACHINE, AND METHOD FOR ADJUSTING A FOCUSED LASER BEAM

This application claims benefit as a non-provisional of prior U.S. provisional application No. 61/674,276 filed on Jul. 20, 2012, and this application also claims benefit of priority to prior European application no. EP12177388 filed on Jul. 20, 2012, and the present application claims benefit as a C-I-P continuation-in-part of prior PCT international application no. PCT/IB2012/050119 filed on Jan. 10, 2012 designating the U.S. and claiming benefit of priority to prior European application no. EP11152317 filed on Jan. 27, 2011 and also claiming benefit as a non-provisional of prior U.S. provisional application No. 61/436,717 filed on Jan. 27, 2011, and the entireties of European application no. EP12177388, of U.S. application No. 61/674,276, and of parent PCT international application no. PCT/IB2012/050119 are all expressly incorporated herein by reference in their entireties and as to all their parts, for all intents and purposes, as if all identically set forth in full herein.

The disclosure relates to laser processing machines, laser cutting machines, and also methods for adjusting focused laser work beams in laser processing machines. The term "focused beam" always refers to the laser beam downstream of the focusing element (e.g. focusing lens).

As is known, the laser beam for a cutting process in the case of laser cutting machines should be guided as centrally as possible through the cutting nozzle of the cutting head. As a lateral displacement of the optical lenses in the cutting head, caused by a change of the lens or the lens insert, may often have a displacement of the optical axis as consequence, in practice, a repeated centering process of the cutting nozzle is necessary.

The beam parameters must be suitable for a workpiece so that a laser beam cuts optimally. The focus position of the laser beam both in the axial direction and in the lateral direction is also an important parameter in this case. Ideally, these parameters may be measured and adjusted in a machine-integrated manner. A machine-integrated measuring would make sense, because the variable mentioned may change with time. The changes come about due to thermal instabilities along the entire beam propagation, from resonator end mirror to processing focus. In particular, contaminated and aged focusing lenses effect a changed focus in the axial direction.

The focus position adjustment in the lateral direction is also termed nozzle adjustment or nozzle centering. In this case, it is valid to position the nozzle opening centrally with respect to the laser beam (or vice versa). Focus position adjustment in the axial direction is also used for the ideal positioning of the focus with respect to the nozzle tip and thus to the workpiece to be processed.

A method for determining the position of a laser beam passing through a nozzle opening of a laser processing nozzle relative to the opening is known from German published application DE102007048471A1. The nozzle body and the laser beam are moved relatively to one another along the propagation direction (Z) of the laser beam until—as a consequence of the conical propagation of the laser beam—a portion of the laser radiation is drawn out of an edge region of the laser beam at a special optical scattering or mirror surface surrounding the opening. Subsequently, the intensity of the laser radiation reflected and scattered by the scattering or mirror surface is detected simultaneously at a plurality of measuring surfaces and the intensity of the laser radiation detected at the plurality of measuring surfaces is compared for determining the position of the laser beam relatively to the nozzle opening. The portion of the laser radiation drawn off is therefore scattered diffusely at the scattering surface or laser radiation reflected at the mirror surface having a curvature in the radial direction or the combined scattering surface is expanded or focused.

DE102007048471A1 also discloses a laser processing nozzle that has a nozzle body with a nozzle opening for the passage of a focused laser beam, and also a mirror surface or combined scattering/mirror surface, this surface being formed on the nozzle body and surrounding the opening for drawing a portion of the laser radiation out of an edge region of the laser beam. In this case, the mirror surface or the combined scattering/mirror surface has a curvature in the radial direction.

According to the above technology, a mirror surface or combined scattering/mirror surface with radial curvature formed on the nozzle body is used to draw off a laser radiation portion and to extend or focus the reflected laser radiation portion. This also requires a plurality of complicated optical measures. Contaminants on the mirror surfaces may lead to the destruction of the unprotected mirror surfaces in the direct vicinity of the nozzle, as they then no longer mirror, or in any case to a distortion of the measurement result, that, according to this reference consists of a simultaneously combined measurement result of all sensors.

German published application DE102007013623A1 further describes an apparatus and a method for orientating a laser beam propagating in the Z direction through a nozzle bore of a laser processing nozzle on a laser processing head, which is defined in the X-Y plane, including the steps:
activating the laser beam with a defined energy;
moving the laser beam along a first line in the X-Y plane;
measuring the radiation upstream of the nozzle bore;
determining first two peripheral points on the first line which lie on the edge of the nozzle bore, by means of the evaluation of the measured radiation;
determining a first target point between the first two peripheral points on the first line and orientation of the laser beam to this first target point.

This apparatus has sensors detecting a portion of laser radiation reflected from the laser beam by the laser processing nozzle.

In this centering technology, the laser beam should therefore be moved in the X-Y plane initially along a first line and subsequently along a second line. However, this is complicated due to the complicated optical conditions required there with regards to the desired scattering of the laser beam at special optical scattering surfaces, and special measures are required. Furthermore, the apparatus requires at least four sensors.

Improved laser processing machines and improved centering methods, by which the above-mentioned disadvantages of the prior art may possibly be reduced or eliminated, are desirable. The repeatable centering of the laser processing beam within the nozzle bore of the laser processing head should be carried out in simpler fashion in an automatable manner, without special optical measures such as mirrors or expansion optics or the like for the laser beam. Using a laser beam that may be moved in the axial direction, a capacity all laser cutting machines generally have, the focus position may be determined relative to the nozzle tip and thus to the workpiece with the nozzle centering mentioned.

Versions of laser processing machines within the present disclosure thus depart from the above-explained prior art, i.e. from a laser processing machine which is equipped with at least one laser processing head, that has an interior and a laser processing nozzle with a nozzle opening for directing a laser work beam onto a workpiece to be processed. Versions of the machines within the present disclosure may also have an orientation device provided with at least one sensor, for centering the laser work beam relative to the nozzle opening.

The nature of laser processing machines within the present disclosure may be seen in the fact that in the event of insufficient centering of the nozzle opening relatively to the focused primary (laser) beam (first electromagnetic energy beam) in the region of the nozzle opening, at least one first beam handling unit is arranged in the region of the nozzle opening, this being constructed in a manner suitable for converting the primary beam into a secondary electromagnetic beam, particularly a wide-band heat beam and for emitting the secondary beam along a propagation direction in the direction of the sensor, or for reflecting/scattering at least a portion of the primary focused beam along the propagation direction in the direction of the sensor. The sensor for detecting the converted secondary beam is arranged within the laser processing head.

In the sense of the present disclosure, the following may therefore be carried out:
a) The primary beam is converted into heat radiation (as secondary beam) at the primary beam handling unit (in the region of the nozzle opening) and detected by means of sensors in the NIR or visible range. Here, the primary beam handling unit is therefore constructed as a sapphire ring or similar ring/fitting which absorbs the primary radiation ($CO_2$ radiation) and emits it as heat radiation; or,
b) The primary beam is reflected/scattered at the primary beam handling unit (in the region of the nozzle opening) and is detected directly with a thermopile or other infrared detector that can detect direct $CO_2$ radiation; or,
c) The primary beam is reflected/scattered at the primary beam handling unit and is absorbed in a secondary beam handling unit, e.g. glass pane upstream of the sensor. This glass pane emits heat radiation that may be detected by means of sensors in the NIR or visible range.

It should be mentioned that even two or three of the above mechanisms a)-c) may act simultaneously in an exemplary version (wherein if appropriate, one of them dominates by an order of magnitude however).

The laser beam touches the nozzle edge. A special calibration nozzle is preferably used as nozzle. In a preferred version, this has a primary beam handling unit, e.g. a conversion ring made of sapphire, which is arranged in the nozzle. The conversion ring absorbs the $CO_2$ light and re-emits the energy as heat radiation. This emission is substantially isotropic. The heat radiation is wide-band (Planck radiation) and therefore also well detectable in the near-infrared (NIR) and even in the visible range, so that one can choose a sensor very flexibly. Thus, inexpensive and popular detectors may be used for these accessible spectral ranges, typically InGaAs detectors or even Si detectors. In this case, the at least one sensor is arranged in the interior of the nozzle or in the interior of the nozzle holder or the laser processing head, in order to detect the secondary (electromagnetic) heat radiation.

Depending on the power of the radiation source to be detected or sensitivity of the detection system, a reflection coating is recommended on the primary beam handling unit, (for example, the conversion ring). The reflection coating reflects a portion of the $CO_2$ radiation before the conversion, so that not too much energy be absorbed by the conversion ring destroying the same. A gold coating with a layer thickness of a few tens of nanometers is for example recommended as coating. The conversion ring as primary beam handling unit is, for example, produced from sapphire. Alternative materials to sapphire are, for example, all glass materials, particularly quartz glass ($SiO_2$).

The at least one sensor provided in the interior of the laser processing head is arranged at an axial distance from the nozzle and thus better protected from the cutting process.

In a preferred version, the at least one sensor for detecting the converted secondary heat radiation with wavelength portions in the visible and in the near-infrared (NIR) range is an NIR detector. An NIR detector that may be employed is an InGaAs diode that can detect radiation from approx. 1.0-2.6 µm. In measurements carried out with these diodes in a design which was actually realized, (according to the NIR spectrum) radiation of approx. 1.0-2.2 µm was actually detected. Further experiments have shown that the signals could also be measured in the visible spectral range using Si detectors.

Ideally, one (or a plurality of) glass pane(s) is located upstream of each sensor, and protects the sensor from contaminants on the one hand and from damaging CO2 laser radiation (above 10 µm) on the other hand.

The glass pane upstream of the sensor may function as the second beam handling unit converting the $CO_2$ laser radiation into heat radiation. The glass pane as the secondary beam handling unit therefore acts analogously to the primary beam handling unit, as a device converting the $CO_2$ laser radiation into heat radiation, in order to allow an optimal detection on the sensor and to optimally employ the properties thereof for the purpose of centering.

In another preferred version, the first beam handling unit is suitable to divert at least a portion of the focused primary laser beam into secondary electromagnetic radiation, namely into a scattered/reflected radiation, which, if appropriate, is detected at least by a sensor. The scattered/reflected cone of the $CO_2$ light that is thrown back into the processing head is very large, however. An inclined surface of a funnel-shaped conversion unit on the nozzle edge is therefore advantageous. By contrast, the angle of the inclined position of the diversion edge is relatively tolerant according to our experiments, as the scattered cone is relatively large.

The repeatable and quite precise short-term centering may therefore be automated. This is a fundamental prerequisite for high-quality laser cutting in which no direction-dependent cutting results may arise.

Instead of external temperature sensors and the impact of the laser beam on the workpiece, an impact of the focused primary laser work beam on the inner beam handling unit in the vicinity of the nozzle opening or upstream of the sensors generates a secondary beam, particularly heat radiation with wavelength portions in the visible and near-infrared ranges when the laser work beam/nozzle opening system is in an uncentered state, and the thus-generated inner secondary electromagnetic heat beam is reliably detected by at least one inner sensor. Thus, the focused primary electromagnetic beam, such as a $CO_2$ laser work beam, is converted to a secondary heat beam detectable for InGaAs diodes. Instead of InGaAs diodes, detectors in the visible range, for example Si diodes, may also be used, although with reduced signal strength.

Alternatively, the primary radiation may be reflected/scattered back at the first primary beam handling unit (in the region of the nozzle opening) and is detected directly with a thermopile or other infrared detector that can detect direct $CO_2$ radiation.

For a CNC system of the machine (main axes), which is known per se, it is possible to calculate the center of the nozzle bore in a manner known per se from the digital sensor measured values. It is however necessary to link the appearance of the radiation with the exact axial position (X-Y coordinates). Subsequently, the machine is already in a position to displace the nozzle fast and exactly in the sense of centering relatively to the laser beam, or vice versa, by means of the orientation device. If necessary, as is known per se, the lens may also only be displaced in the laser beam in order to orientate the laser radiation relatively to the nozzle opening following detection of the heat radiation from the beam handling unit.

Measures for automatic nozzle centering according to the present disclosure are as follows:

The secondary radiation (for example, heat radiation) arising at the first and/or second beam handling unit is detected by at least one inner sensor. This is achieved with a special and novel nozzle construction with at least one beam handling unit. It is not the $CO_2$ laser radiation itself, but rather a secondary heat radiation that is detected. This heat radiation may also be best and beneficially detected at smaller wavelengths with high-resolution sensors that detect without delay, such as InGaAs sensors or Si diodes (that are known per se);

The at least one inner radiation sensor is advantageously arranged in the interior of the processing head in such manner as to detect secondary radiation;

The laser performance during running to nozzle centering may take place with high power (that is, operating power, kilowatt range), in order to correspond with the normal cutting state to the greatest extent possible;

In order to not damage the nozzle by the high laser power, according to a special version, the system must be equipped in such a manner that it is in a position to detect the secondary radiation as quickly as possible and subsequently to switch off the primary laser work beam immediately or, in the event of the detection of the beam, to immediately travel the beam back into the center of the nozzle;

The CNC control of the machine is in a position to link the appearance of the secondary radiation with the exact axial position (X-Y coordinates); this requires a sufficiently fast detection and processing of the signal;

The chosen combination of beam wavelength conversion and NIR detection by means of at least one sensor has best proved itself in prototypes. The running of the laser work beam to the inner conversion edge preferably takes place in four axial directions (X+; X−; Y+; Y−) one after the other.

Methods according to the present disclosure may also be carried out as follows:

A starting point always begins at the last saved center. From this point, by adjusting the nozzle or by adjusting the nozzle holder relatively to the nozzle, a nozzle edge is run-to via the work laser beam. As soon as a secondary beam is detected by the at least one sensor, the control saves the coordinates. This is repeated in all four (if need be three) axial directions. The running of the laser work beam through the nozzle may be carried out with the inner beam handling unit in three or four axial directions (X+; X−; Y+; Y−) of the X-Y coordinate plane. The control calculates a new center therefrom. To increase the accuracy, the above procedure is preferably carried out again. Centers which differ from one another following a plurality of centering runs may also be interpolated using a computer to form an actual center. Only the new center is then finally used for laser processing.

According to a further feature within the scope of the present disclosure, for the above-described lateral adjustment of the focus of the primary electromagnetic beam, the $CO_2$ laser work beam in particular is also adjusted in axial directions with respect to the nozzle tip or nozzle opening of the primary beam. Preferably, during the adjustment, the preferred axial position of the focus of the primary electromagnetic beam is brought into the ideal position for the workpiece to be processed. The axial adjustment of the focus of the primary beam typically takes place as follows:

It is centered on an axial position of the focusing lens, e.g. z=0. The travel d emerges from this centering (see below FIGS. 4A and 4B). Then, one moves the focusing lens to position z=2 and repeats the centering. A travel d also emerges therefrom. Likewise, one also travels with the positions z=4 etc. to e.g. z=30. A travel d and thus the curve results from every centering (FIG. 5). Obviously, the travel d is maximum when the focus lies at the nozzle tip. Thus, the vertex of the curve reproduces the focus position at the nozzle tip. If the lens position at which the focus position lies at the nozzle tip is known, then the focus position may easily be derived for any desired lens position.

Instead of the axial travel by means of the focusing lens described here, the laser beam may also be displaced by means of other optical elements, particularly adaptive mirrors. This focus position detection and adjustment relatively to the nozzle tip may be carried out from a few 100 W to a plurality of kW (tested up to 6 kW) with a sub-mm resolution.

Further advantages, features and details result from the following description in which exemplary versions are described with reference to the appended drawings. Generally it should be understood that the features mentioned may be utilized individually by themselves or in any desired combination, as shall be understood by skilled readers of the present disclosure.

The appended reference list is part of the disclosure. The figures are described in a cohesive and comprehensive manner. Identical reference numbers indicate identical components, reference numbers with different indices indicate functionally identical or similar components. In the figures:

FIGS. 4A and 4B depict schematic illustrations of the travel d for nozzle centering at different axial focus positions;

FIG. 5 shows a diagram for determining the travel d as a function of the focusing lens position;

Reference in this specification to "versions," "one version," "a version," and the like, should be understood to mean that a particular feature, structure, or characteristic described in connection with the version is included in at least one such version of the disclosure. The appearances of phrases such as "in one/a version," "in versions," and the like in various places in the specification are not necessarily all referring to the same version or variant, nor are separate or alternative versions or variants mutually exclusive of other versions or variants. Moreover, various features are described which may be exhibited by some versions or variants and not by others. Similarly, various requirements are described which may be requirements for some versions or variants. Furthermore, as used throughout this specification, the terms 'a', 'an', 'at 'least' do not denote a limitation of quantity, but rather denote the presence of at least one of the referenced item, and the term 'a plurality' denotes the presence of more than one referenced items.

Figure 1:
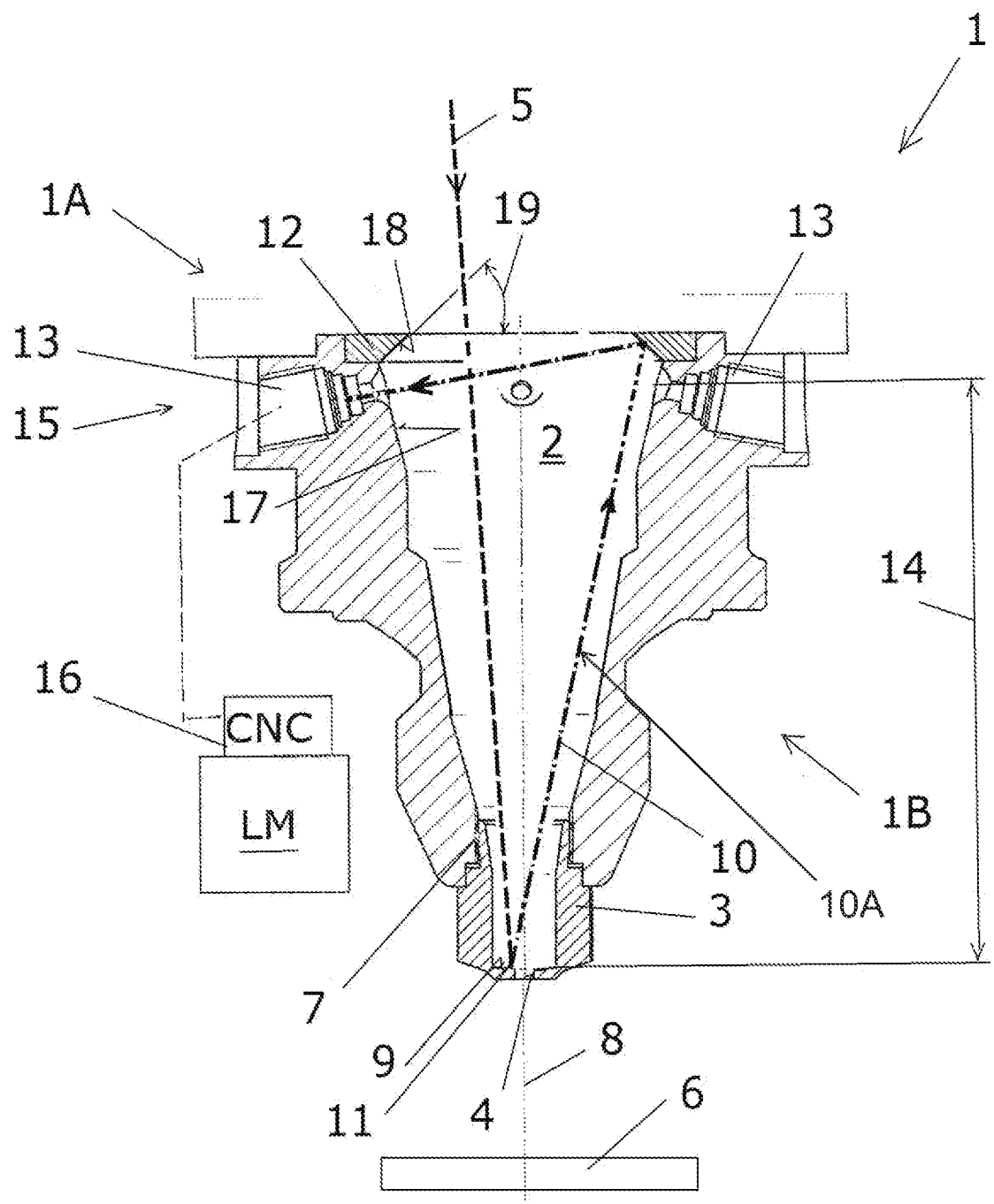
FIG. 1 shows the cross section of a first exemplary version of a laser processing head of a laser processing machine.

In FIG. 1 may be seen structure 1 of a laser processing machine belonging to the (schematically illustrated) laser processing machine LM. The laser processing head 1 is divided into two parts, that is, it includes an upper head part 1A and a lower head part 1B that are arranged displaceably in directions of an X-Y coordinate plane normal to the nozzle axis 8. Such a displaceable and distributed arrangement of the head is for example disclosed in our earlier commonly-owned published European patent appl. EP2409808A1 filed as U.S. provisional appl. Ser. No. 61/374,665 on Aug. 18, 2010 and opened to the public within corresponding published PCT international appl. WO2012/011072A1 dated Jan. 26, 2012 and its corresponding U.S. national phase entry published appl. no. 2013/011267A1, and the entirety of U.S. appl. Ser. No. 61/374,665 is incorporated herein by reference thereto within this disclosure.

The lower head part 1B has an upwardly expanding interior 2 that is delimited from below by a nozzle 3, for example itself a laser processing nozzle, or preferably a special centering nozzle or calibration nozzle. The nozzle 3 is constructed with an axial nozzle opening 4 for directing one of the primary focused beams 5 (generated in a manner known per se), particularly a laser work beam onto a workpiece 6 to be processed. The nozzle 3 is here releasably connected to the head part 1B, for example by means of a quick release closure 7, wherein the nozzle opening 4 thereof is arranged coaxially to the rotationally symmetrical interior 2 of the lower head part 1B. In FIG. 1, the primary focused electromagnetic beam 5, laser work beam in particular, is illustrated schematically by a dashed line.

As previously mentioned, it is to be stressed that the term "focused beam" is always to be understood to mean a laser beam downstream of the focusing element (e.g. focusing lens).

In the region of the nozzle opening 4, at least one inner first beam handling unit 9 is provided, for example in the form of a nozzle edge or an insert element. In the case of insufficient centering of the nozzle opening 4 relatively to the primary focused beam 5, this is sufficient:

a) for converting the primary, focused beam 5 into a secondary electromagnetic beam 10, particularly a heat beam; the primary beam 5 is therefore converted by the first beam handling unit 9 into heat radiation, i.e. the $CO_2$ radiation is absorbed and emitted as heat radiation along a propagation direction 10A in the direction of the sensor 13; and/or, b) for diverting the primary, focused beam 5 by reflection/scattering along the propagation direction 10A in the direction of the sensor 13.

Figure 6:
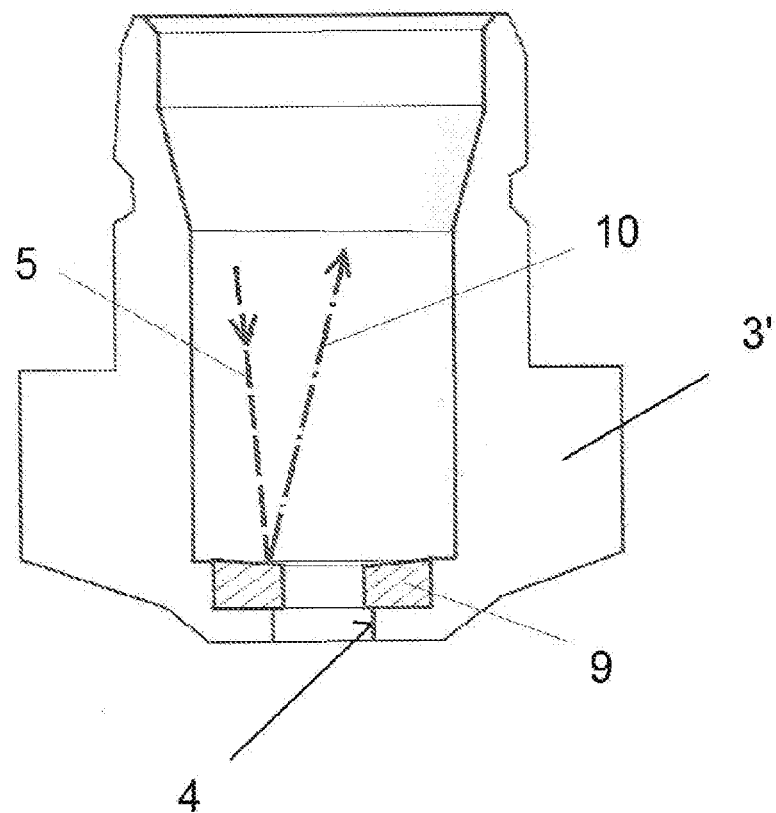
FIG. 6 shows a cross section of a centering nozzle with installed conversion ring; and, FIG. 7 shows a schematic illustration of a fourth exemplary version of a laser processing head, wherein detection takes place above focusing lens.
Figure 7:
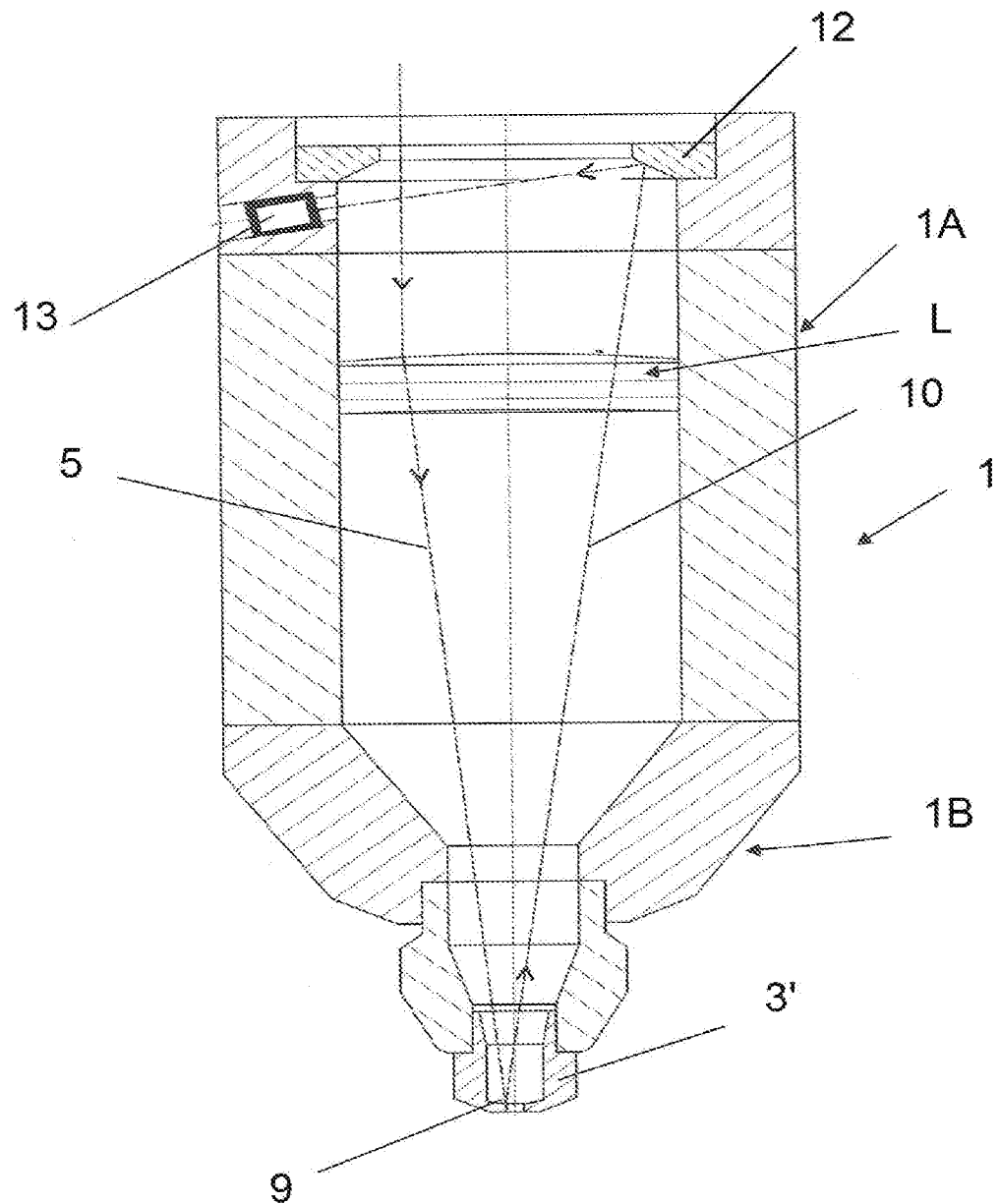

The first beam handling unit 9, typically an absorbing insert element, is typically installed in such a manner (see also FIG. 6), that heat radiation 10 emitted therefrom, which radiates substantially isotropically, is diverted also along the dot-dashed beam direction 10A in FIG. 1 onto a reflector 12 and after diversion at this reflector 12 is detected by at least one sensor 13 (FIGS. 1 and 7).

Thus the present disclosure includes methods for adjusting a primary beam (5), particularly a focused laser work beam with respect to a nozzle opening (4) of a laser processing head (1) of a laser processing machine (LM), where:

an X-Y coordinate plane in a normal plane to a nozzle axis (8) is defined before or during laser processing;

in that a first beam handling unit (9) is provided in the interior of the nozzle (3; 3'), at which a long-wave IR beam of the primary electromagnetic beam (5) is converted into a wide-band heat radiation as secondary radiation (10) and emitted and/or diverted into a scattered/reflex beam as secondary radiation (10) along a propagation direction (10A) in the direction of the at least one sensor (13);

in that the primary electromagnetic beam (5), particularly laser work beam is displaced relatively to the nozzle opening (4) or the nozzle (3; 3') is displaced transversely to the X-Y coordinate plane relatively to the primary electromagnetic beam (5) until the primary electromagnetic beam (5) hits the first beam handling unit (9) and is there radiated at least to some extent as secondary radiation (10) along the propagation direction (10A) and hits the at least one sensor (13);

and in that each measured value of the at least one sensor (13) determined by means of the secondary beam (10) are assigned to associated X-Y coordinates of the nozzle axis (8) and the primary beam (5);

and in that after a plurality of displacements, the respective position of the center of the nozzle opening (4) relatively to that of the primary beam (5) is calculated by means of a computer from a plurality of measured values according to the steps c) and d);

and accordingly, the center of the nozzle opening (4) and the primary electromagnetic beam (5) are automatically displaced relatively to one another in the sense of centering.

It is to be stressed, however that the first beam handling unit 9 could be constructed with (or without) a nozzle opening 4 as a separate element, that for example may be fixed on an inner envelope surface of the laser processing nozzle 3 in the predetermined axial position thereof (not shown). It is also possible that the first beam handling unit 9 be constructed from a plurality of conversion parts, e.g. from radial segments (not illustrated).

Figure 3:
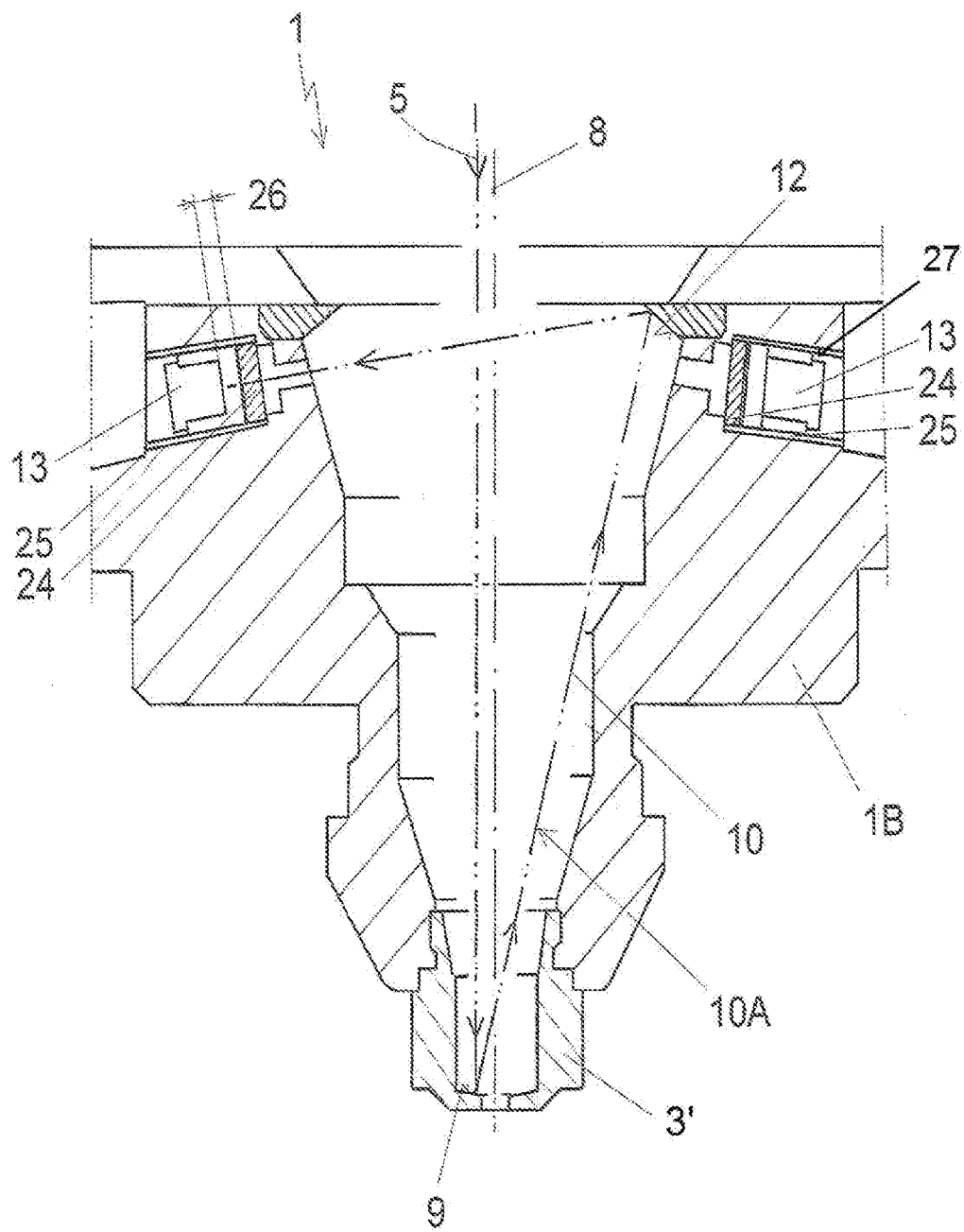
FIG. 3 depicts a schematic illustration of a third exemplary laser processing head.

In FIG. 3 the first conversion unit 9 is constructed on an inner envelope surface of a separate additional centering element, particularly a centering nozzle 3', that replaces the laser processing nozzle during a centering process, for example before normal machine operation. This centering nozzle 3' is therefore coaxially arranged and releasably fixed on the lower end of the laser processing head 1 after the removal of the laser processing nozzle. By using this additional centering nozzle 3', the laser processing nozzle may even be relieved completely from the small loads of the centering process.

The sensors 13, which detect the secondary beam 10, for example heat beam at the end of the beam path thereof along the dot-dashed beam direction 10A, are preferably arranged at an axial distance 14 from the conversion unit 9 and sunk in the wall of the interior 2 of the head 1 as depicted in FIG. 1.

The sensors 13 belong to an orientation device 15 of the machine LM that is suitable to displace, that is to center the lower head part 1B together with the nozzle opening 4 relative to the primary beam 5. To this end, the orientation device 15 is equipped with known drives (main axes of the machine that are not illustrated in greater detail), that enable the necessary adjustments at least in X-Y orientations. Such orientation devices are known in more detail from the aforementioned commonly-owned U.S. provisional appl. Ser. No. 61/374,665 previously incorporated herein in its entirety by reference thereto within this disclosure. The sensors 13 of the orientation device 15 deliver measurement signals to a CNC system 16, that is known per se, of the laser processing machine LM, FIG. 1.

Figure 3A:
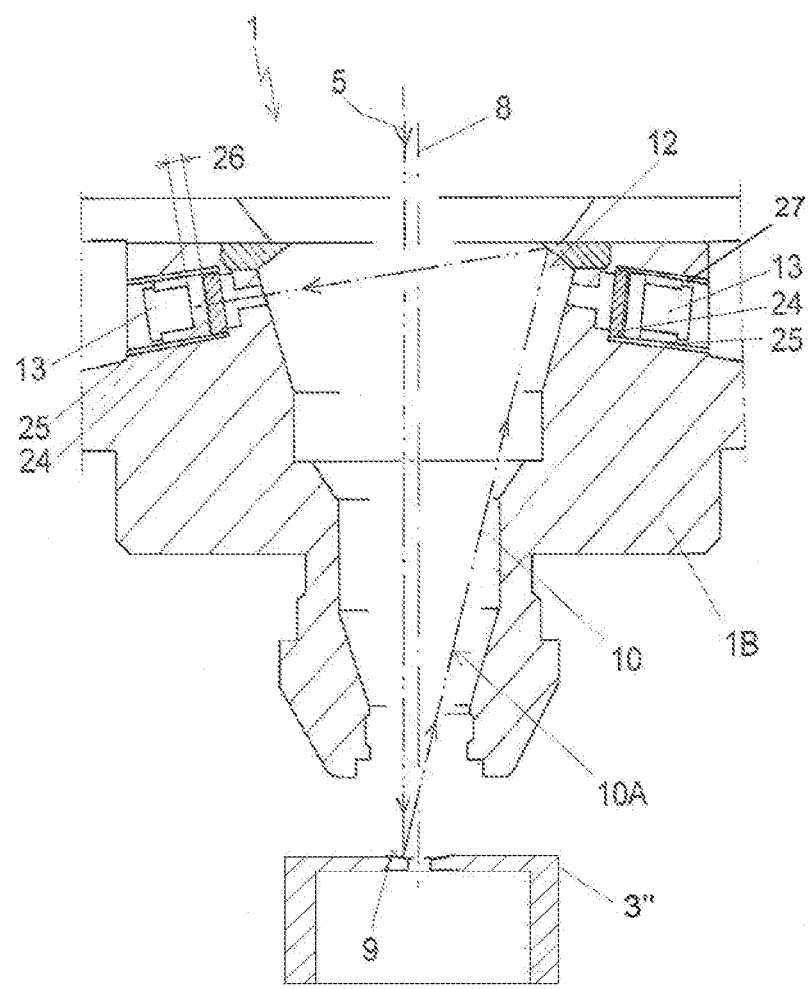
FIG. 3A depicts a schematic illustration of a variant of an arrangement according to FIG. 3, wherein an external centering unit with beam handling unit is provided however.

However, the first beam handling unit 9 is not necessarily provided in the laser processing nozzle 3 itself, rather it may also be present outside of the head 1 as a centering element 3". This latter arrangement is illustrated in FIG. 3A, wherein the external centering element 3" not belonging to the cutting head 1, is arranged coaxially below the head 1, and the conversion unit 9 is attached on the external centering element 3".

When centering, the relative running of the primary focused beam 5, laser work beam in particular, to the nozzle 3, is preferably carried out in four axial directions X+ and X−, and also Y+ and Y−. The primary beam 5 is therefore displaced relatively to the nozzle 3 in all four directions +/−X and +/−Y until the primary beam 5 is in each case guided onto the edge of the primary beam handling unit 9 as the secondary beam, that is heat beam 10 along the heat beam path 10A described above. At the end thereof, the secondary beam 10 is detected by the optical sensors 13 and the measured values thereof are saved. The saved measured values must however be linked with the exact axial position (coordinates X-Y). This means that the sensors 13 in each case only generate one piece of information for the control. However, this also saves the coordinates. As a result, it is possible from an uncentered state, for the CNC system 16 to calculate the center of the nozzle opening 4 as a centered setpoint position.

Subsequently, the actual automatic nozzle centering may be carried out by displacement of the head part 1B with respect to the head part 1A in directions of the X-Y axes by actuating the orientation device 15. If the above fully automatic nozzle centering process is executed by following all directions of the X-Y plane bearing a preceding sign, then the center of the nozzle opening 4 is displaced by the laser processing machine LM fast, systematically and precisely into the primary beam 5, particularly laser work beam.

For this version, provision is made for the laser processing head 1 to be adjustable in the X-Y plane with the aid of the drives of the orientation device 15. The measuring of the centered position of the nozzle 4 may for example be executed as follows:

Start at $X_{min}$ and a displacement takes place until $X_{max}$. In between, there is a heat beam maximum and a heat beam minimum. The heat beam minimum indicates the ideal centering in the X direction, the computer takes note of this;

Subsequently, there is a start at $Y_{min}$ and a displacement until $Y_{max}$. In between, there is also a heat beam maximum and a heat beam minimum. The heat beam minimum indicates the ideal centering in the Y direction, the computer takes note of this; a computer (of the CNC system) then brings the X and Y axes precisely into the heat beam minimum positions of X and Y, whereupon the ideal centering is attained.

The running of the focused primary beam (5) through the nozzle (3,3') may be carried out with the inner first beam handling unit (9) from $X_{min}$ to $X_{max}$, and also the beam maxima and the beam minimum lying therebetween is determined; and the running of the primary beam (5) through the nozzle (3;3') may be carried out with the internal beam handling unit (9) from $Y_{min}$ to $Y_{max}$, and also the beam maxima and the beam minimum lying therebetween are determined. For centering, the X or Y coordinates of the center of the nozzle opening (4) are adjusted to the X or Y coordinates of the beam minimum ($X_{min}$ and $Y_{min}$).

It is important in this case that the centering system not be based on reflection and absorption of the laser work beam and temperature measurements at the workpiece below the nozzle. Rather, at least one sensor 13, as for example at least one optical sensor, is provided for detecting the heat radiation, being arranged inside the laser processing head 1 below or else above the focusing optic (see also FIG. 7), but in any case well above the nozzle 3. The at least one sensor 13 is therefore not arranged in the lower head part in FIG. 7. Thus, the signals transmitted with the aid of the primary beam 5 through the secondary heat beam 10 to the sensors 13 may be detected fast, precisely and reproducibly.

In FIG. 1, four optical sensors 13 are provided, being distributed evenly in the interior 2 along the circumference of an inner envelope surface 17 of the laser processing head 1 (if appropriate in a ring shape) in a plane parallel to the X-Y plane (only two of these are illustrated in FIG. 1). Fewer or more than the four sensors 13 described here may be provided. Experiments have shown that the centering itself functions with just one detector.

As already mentioned above, in FIG. 1, the reflector 12 is arranged for diverting/converting the secondary beam 10 arising at the primary beam handling unit 9 in the direction of the sensors 13 along the V-shaped beam propagation direction 10A. In the first exemplary version, the reflector 12 has a conical reflection surface 18. This encloses an angle 19 with the horizontal in the radial direction, the value of which is preferably approximately 45°. According to FIG. 1, the annular reflector 12 is coaxially and releasably fixed as a ring element in the upper region of the lower head part 1B. If appropriate, the reflector 12 could be constructed from a plurality of parts, for example segments (not illustrated). In a typical exemplary version, it is simply constructed on the inner wall of the nozzle. By contrast, in the version according to FIG. 7, the reflector 12 is attached in the upper head part.

Figure 2:
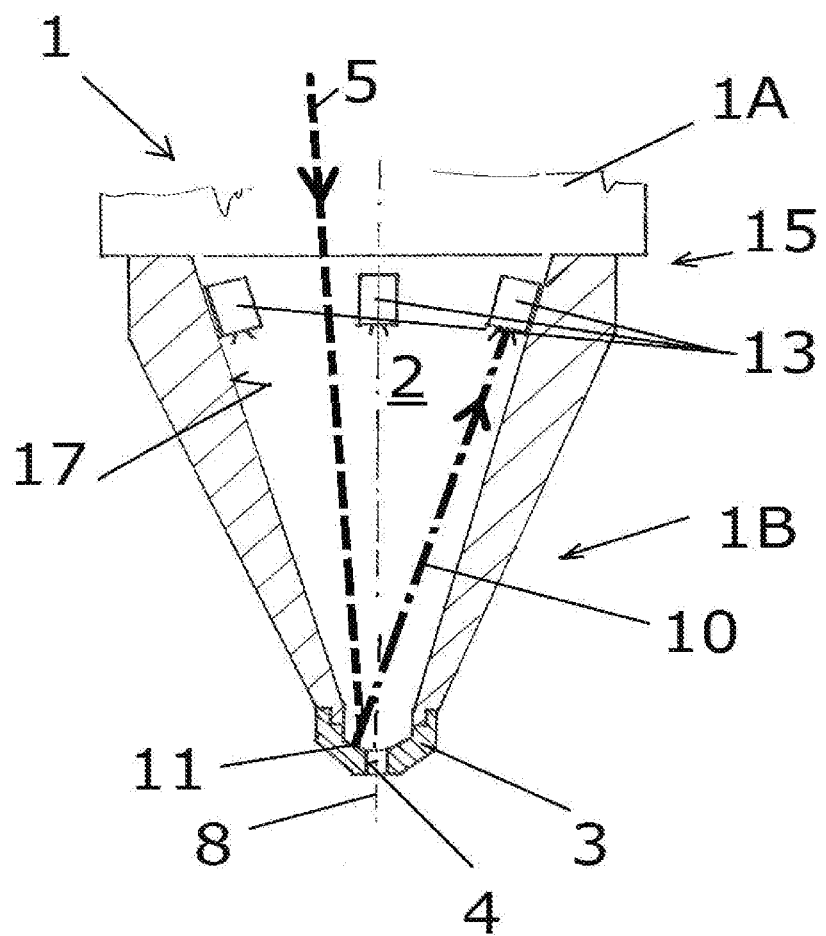
FIG. 2 depicts a schematic illustration of a second exemplary version of a laser processing head.

The second constructively simpler exemplary version of the laser processing head 1 is illustrated schematically in FIG. 2. A notable difference from the first version according to FIG. 1 lies in that the propagation direction 10A of the secondary heat beam 10 leads not via a reflector, but rather directly to one of the optical sensors 13. The sensors 13 are evenly distributed in the interior 2 along the circumference of an inner envelope surface 17 of the laser processing head 1, for example in a plane parallel to the X-Y plane, and orientated downwards in such a manner that they can directly detect the secondary beam 10 arising at the first beam handling unit 9 via the propagation direction 10A thereof. Thus, the measured value detection takes place faster, more precisely and more reproducibly. A point of impingement of the primary beam 5 is designated as 11.

The third exemplary version of the laser processing head 1 is illustrated in FIG. 3, wherein four sensors 13 are orientated by approximately 85° relatively to the nozzle axis 8 in the radial direction in the interior. A first beam handling unit 9, e.g. a diversion edge of a centering nozzle 3' is inclined in such a manner that a secondary conversion beam 10 converted or reflected at the same is diverted along a V-shaped propagation direction 10A onto a beam reflector 12 and after reflection is detected at this reflector 12 by a sensor 13.

The sensors 13 here are "InGaAs" sensors to which preferably at least one beam handling unit 24, for example a glass template, particularly a glass pane is associated in each case, this glass being respectively provided on one end face with a HR coating ("high reflectivity"=high reflectivity for long wave radiation—particularly $CO_2$ laser radiation) (the coating itself is not depicted). The coated glass panes 24 are in this case advantageously produced from commercially available $SiO_2$ glass. The second beam handling unit (24) may be arranged upstream of the at least one sensor (13) in the form of a glass pane, and be provided with a reflection layer for the primary beam (5) on at least one surface transversely to the propagation direction (10A) of the secondary beam (10).

In this exemplary version according to FIG. 3, each glass pane 24 is arranged upstream of the associated "InGaAs" sensor 13 with a spacing 26 and preferably in a common housing 25. Each removable holder 25, together with the installed "InGaAs" sensor 13 and glass pane 24, is fixed in a respective recess 27 of the lower head part 1B.

In the case of automatic nozzle centering with the exemplary version according to FIG. 3, the centering nozzle 3' is displaced relatively to the focused primary beam, particularly laser work beam 5 along an X or Y axial direction until one of the "InGaAs" sensors 13 has reached a particular level. The four "InGaAs" sensors 13 are therefore "illuminated" by the electromagnetic radiation by means of the +/−X and +/−Y displacements of the cutting head, i.e. the laser beam is displaced in the +X axial direction, the laser beam is reflected by the nozzle edge as the first beam handling unit 9 and hits the sensors via a mirror in the cutting head through a filter through the glass pane 24 as second beam handling unit, which absorbs the laser radiation and re-emits the energy as heat radiation which is ultimately detected by the "InGaAs" diode(s).

Thus, a focused primary electromagnetic beam, such as a $CO_2$ laser work beam 5 with a wavelength of approximately 10.6 μm may be converted to secondary heat radiation 10 with wavelengths of approximately 1.0-2.2 μm. This radiation is visible for a radiation sensor 13. Such conversion may take place at the first beam handling unit 9 and/or at the second beam handling unit 24 in the form of a reflex coated glass pane upstream of a NIR radiation sensor 13.

As soon as the sum of the intensities of all four "InGaAs" diodes 13 exceeds a certain value, the primary laser beam 5 switches off immediately. If this is done in all four X and Y axial directions, the mutual positions of the primary laser work beam 5 and the laser processing nozzle 3 or the centering nozzle 3' may be determined therefrom, and therefore the laser processing nozzle 3 or the centering nozzle 3' are centered fast, reliably and repeatably.

A travel d for nozzle centering or focus position adjustment at different axial focus positions is illustrated schematically in FIGS. 4A and 4B. In FIG. 4A, a focus F of the laser beam 5 is located with a spacing A below the nozzle opening 4. In FIG. 4B, however, a focus F of the laser beam 5 is located in the region of the nozzle tip. By moving the nozzle 3' relatively to the laser beam 5 in the lateral direction, the nozzle 3 is centered relatively to the laser beam 5 (or vice versa, i.e. moving the laser beam 5 relatively to the nozzle 3). In this case, the nozzle 3' is displaced in one direction until it touches the laser beam 5.

The laser beam 5 is converted or reflected by means of the first beam handling unit, here at the nozzle edge, to a detectable secondary radiation. This secondary radiation is then detected by means of at least one sensor (not depicted here). Subsequently, the nozzle 3' travels in the opposite direction in turn until the laser beam 5 touches the nozzle edge. In the center of the two contact points, the nozzle 3' is ideally adjusted for the laser beam 5 in the traveled lateral direction. In order to adjust the nozzle 3 in the lateral direction rotated through 90°, the above sequence is used accordingly in this direction.

FIGS. 4A and 4B therefore show that the lateral travel d of the laser beam 5 relatively to the nozzle 3 is dependent on the axial focus position. In this case, the travel d with focus F outside of the nozzle tip (FIG. 4A) is significantly smaller than if the focus F lies in the region of the nozzle tip (FIG. 4B). This circumstance can be utilized for detecting the focus position in the axial direction. As should be understood, the preferred axial position of the focus F of the primary electromagnetic beam 5 may be measured by means of nozzle centering and be set in an application-specific manner. The axial position of the focus F of the primary electromagnetic beam 5 may be set in the region of the nozzle opening 4 or to a predetermined position in relation to the workpiece to be processed.

In the event of a different focus position in the axial direction (typically changeable by means of moving the focusing lens L), a nozzle centering is carried out. This results in a curve (see FIG. 5). In this case, it can be seen that the travel d is maximum when the focus F lies at the nozzle tip (FIG. 4B). Thus, a vertex of the curve K reproduces the focus position at the nozzle tip. This focus position detection relatively to the nozzle tip may be carried out from a few 100 W to a plurality of kW. If the setting for which the focus position lies at the nozzle tip is known, then any desired setting may be run-to and set. Instead of the axial travel by means of the focusing lens L, the laser beam 5 may also be displaced by means of other optical elements, particularly adaptive mirrors.

A preferred version of the centering nozzle 3' (calibration nozzle) with installed conversion ring is illustrated in FIG. 6 as first beam handling unit 9 according to the invention. The conversion of the primary $CO_2$ radiation 5 into secondary heat radiation 10 results as follows:

The primary laser beam 5 touches the nozzle periphery as depicted in FIG. 6. The nozzle 3', as a special calibration nozzle, has the sapphire ring on the edge of the nozzle opening 4, which is actually used as the primary beam handling unit 9 and which absorbs the $CO_2$ beam 5 and re-emits the absorbed energy as secondary heat radiation 10. This emission is substantially isotropic. This secondary heat radiation 10 is wide-banded (Planck radiation) and therefore also well detectable in the near-infrared (NIR) and even in the visible range.

Thus, inexpensive and popular detectors/sensors 13 may be used for these accessible spectral ranges, particularly InGaAs detectors or even Si detectors. The NIR detectors and Si detectors are already integrated in the cutting head, so that they may advantageously also be used for process observation. Depending on the power of the radiation source 5 to be detected or sensitivity of the detection system, a reflection coating is recommended on the sapphire rings, to reflect a portion of the $CO_2$ radiation 5 before the conversion, so that not too much energy is absorbed by the sapphire rings as such could destroy the same. A gold coating with a layer thickness of a few tens of nanometers is for example recommended as coating. However, a lower power directional beam may be placed in the laser processing beam axis, whereupon the same is adjusted relatively to the nozzle (4) or the nozzle (4) is adjusted relatively to this directional beam.

There are many alternative materials to the sapphire mentioned here as the first beam handling unit 9. Thus, for example, all glass materials such as quartz glass ($SiO_2$), crown glass, flint glass and many more are likewise well suited. In this case, the fact that $CO_2$ radiation is absorbed but short-wave radiation (visible/NIR) is allowed through is utilized. Instead of the materials described, other materials may also be employed, when they have as characteristic that $CO_2$ radiation is absorbed and short-wave light (NIR—visible) is transmitted. The first beam handling unit 9 is arranged coaxially to the nozzle opening 4 in FIG. 6, and also preferably provided with a reflection coating (not shown). The first beam handling unit (9) may be provided with a wear-resistant and/or conversion accelerating coating.

A further exemplary version of a laser processing head 1 is illustrated in FIG. 7. When contacting the primary laser beam 5 on the first beam handling unit 9, that is, the nozzle edge, the radiation 5 is reflected and scattered. This reflected and/or scattered secondary radiation 10 propagates back into the cutting head 1 at a larger spatial angle. If a detector 13 is arranged sufficiently far from the reflection or scattering center (i.e. from the first beam handling unit 9), then the detector 13 will receive this radiation 10 independently of the lateral travel direction. The single detector 13 is a thermopile here, (that is, a measuring device for electromagnetic radiation) or an infrared detector. In this version according to FIG. 7, the primary beam 5 is reflected/scattered at the first beam handling unit 9 and is detected directly with the thermopile or an infrared detector 13 that can detect direct $CO_2$ radiation.

FIG. 7 also depicts another preferred installation location for the single detector 13 in the cutting head 1. Here it is arranged in the upper head part 1A above a focusing lens L. This installation location (with the reflex/scattered beam 10) is best suited for adjusting the focus position according to our experiments, wherein even a reduced number of detectors 13 or even only one is absolutely necessary.

During adjustment, the preferred axial position of the focus F of the primary electromagnetic beam 5 may be measured and set in an application-specific manner by means of nozzle centering.

More important differences of the invention with respect to the cited DE102007048471A1 are as follows:

The present system compares the intensities of the sensors for determining the beam center not as in this prior art, but rather has an empirically determined "stop criterion" that tells the system that it is now at the conversion unit 9 (at the nozzle edge). Accordingly, there is also no need for special scattering surfaces, for which reason, there is no dependence on mirror quality.

In experiments with prototypes of laser processing machine LM according to the present disclosure, the following positive effects in particular have been determined:

The reflected or converted laser work beams could be measured well and precisely with a focal length of approximately 3.75-9 inches (95-230 mm);

In order to get information about the wear resistance of the laser processing nozzle 3, a few thousand centerings were performed on the same conversion unit 9 and the signals recorded, and also the geometry of the conversion unit 9 and the nozzle 3 were observed. This gave the insight that on the basis of the measurement results, it was not possible to detect wear on the conversion unit 9 nor on the nozzle 3 or 3'.

Several substantial advantages that may be achievable by automatic nozzle centering within the present disclosure are as follows:

The centering of the nozzle takes place much more simply, faster and more precisely than in the case of the prior art;

The nozzle centering process is practically wear-free and reproducible;

The fast response allows a centering process with high laser operating power (kW range), as the primary laser work beam 5 is quickly switched off, as soon as the measured signal detected by the beam conversion exceeds a certain predetermined value. The nozzle 3 and the beam handling unit 9 therefore remain wear-free even at this high laser power;

"Quick switching off of the laser beam" means that the reaction time starting with the detection of the beam at the first beam handling unit 9 to the command "laser off" is not bound to the otherwise conventional cycle time of the CNC system of 16-20 ms, but rather takes place without delay via a fast "interrupt signal", i.e. in the microsecond range (e.g. 100 μs). Thanks to this quick switching off of the laser work beam 5, the nozzle 3 and the beam handling unit 9 are only heated at certain points and for a short time. The undesired thermal loading of the nozzle, as can occur in the prior art, is eliminated as a result;

If the first beam handling unit 9 is displaced on the nozzle opening 4 with respect to the laser work beam 5 (or vice versa), then the laser work beam 5 generates a measuring signal at the sensor 13 from the time of its reflection or conversion at the first beam handling unit 9, wherein the control of the machine LM switches the laser off in a timely manner, in order to prevent any damage of the nozzle 3 and the beam handling unit 9;

The at least one optical sensor 13 is not arranged in the vicinity of the (cutting) process (i.e. not in the vicinity of the nozzle tip), but rather relatively far removed therefrom in the laser processing head 1, which has an advantageous effect on the usability (industrial applicability) of the laser processing machine LM;

In order to ensure the diversion of the laser work beam 5 reflected or converted at the beam handling unit 9 in the direction of the at least one sensor 13 in the laser processing head 1 in a standardized manner, the beam handling unit 9 is a conversion edge which, if appropriate, has an angle of inclination;

The production reliability and the work quality of the laser processing machine LM may be increased considerably.

The centering mechanism maybe used for axial focus adjustment.

If focus adjustment is carried out at various laser powers, the laser-induced thermal axial focus offset may be measured using the same. The latter is a measure for the quality of the focusing lens L or the optical elements along the optical path. "Focus offset" here means an offset which arises due to the thermal loading of the lens (without changing the lens position).

Further versions of the laser processing machine LM according to the invention and combinations thereof, for which a specialist person skilled in the art with knowledge of the present disclosure would not require any further technical teaching however, may be understood as within the context of and within the scope of the appended claims. The versions explicitly set forth only represent a proportion of the many possibilities for the invention and should not be used to limit the field of application of the invention. For the person skilled in the art, it should be straightforward to adapt the invention to specific requirements, based on the considerations shown here, without departing from the protected scope of the invention. It should also be understood in the context of the preceding discussion that the present invention is not limited in any manner to the described and drawings-depicted exemplary implementations, but may be realized in many forms and dimensions without abandoning the region and scope of protection of the invention. Thus, in closing, it should be noted that the invention is not limited to the abovementioned versions and exemplary working examples. Further developments, modifications and combinations are also within the scope of the appended patent claims and are placed in the possession of the person skilled in the art from the present disclosure. Accordingly, the techniques and structures described and illustrated herein should be understood to be illustrative and exemplary, and not necessarily limiting upon the scope of the present invention. The scope of the present invention is defined by the appended claims, including known equivalents and unforeseeable equivalents at the time of filing of this application.

LIST OF REFERENCE LABELS

LM Laser processing machine/laser cutting machine
Laser processing head
1A Upper head part
1B Lower head part
2 Interior
3, 3', 3" Nozzle/laser processing nozzle/centering nozzle/centering element
4 Nozzle opening
5 Primary focused electromagnetic beam/laser work beam
6 Workpiece (to process)
7 Releasable connection/quick release closure/thread/fit
8 Nozzle axis
9 First beam handling unit/conversion unit/nozzle edge/sapphire ring
10 Secondary electromagnetic beam/heat beam or scattered reflected beam
10A Propagation direction of the secondary beam
11 Point of impingement
12 Beam reflector
13 Sensor/heat radiation sensor/detector
14 Spacing
15 Orientation device
16 CNC system
17 Inner envelope surface (of the head)
18 Reflection surface
19 Angle
24 Second beam handling unit/glass pane
25 Holder for glass pane and heat radiation sensor
26 Spacing
27 Recess
A Spacing
d Travel
F Focus
K Curve
L Focusing lens

What is claimed is:

1. A laser processing machine comprising:
a laser processing head, said laser processing head having an interior, said interior having an interior wall, said interior wall being disposed about a central axis;
a nozzle associated with said laser processing head, said nozzle having a nozzle opening for a focused laser beam, said nozzle opening having at least one edge;
a beam handling unit disposed near said nozzle opening, said beam handling unit being made of a material converting a focused laser beam at said at least one nozzle opening edge to a wide-band heat beam, said beam handling unit positioned to emit the wide-band heat beam as a secondary electromagnetic radiation beam in a propagation direction back into said interior and away from said nozzle opening and said beam handling unit;
a beam reflector disposed in said laser processing head to reflect the secondary electromagnetic radiation beam; and,
a plurality of radiation sensors, said plurality of radiation sensors being located to sense electromagnetic radiation through at least one hole in said interior wall, said plurality of radiation sensors each respectively disposed at a respective axial distance from said beam handling unit, said beam reflector being positioned to reflect the secondary electromagnetic radiation beam for sensing by at least one of said plurality of radiation sensors.

2. The laser processing machine as claimed in claim 1, wherein:
said nozzle is a special calibration nozzle releasably connected to said laser processing head, said calibration nozzle replacing a laser processing nozzle at said laser processing head.

3. The laser processing machine as claimed in claim 2, wherein:
said beam handling unit is a conversion ring arranged in said calibration nozzle.

4. The laser processing machine as claimed in claim 3, wherein:
said conversion ring is made of sapphire, and said conversion ring is located on said at least one edge of said nozzle opening.

5. The laser processing machine as claimed in claim 3, wherein:
said conversion ring is made of glass that absorbs $CO_2$ radiation.

6. A laser processing machine as claimed in claim 3, further comprising:
a reflection coating on said conversion ring.

7. The laser processing machine as claimed in claim 6, wherein:
said reflection coating is a gold coating.

8. A laser processing machine comprising:
a laser processing head, said laser processing head having an interior, said interior having an interior wall, said interior wall being disposed about a central axis;
an external centering accessory disposed outside of said laser processing head interior;
a beam conversion unit disposed on said external centering accessory, said beam conversion unit being made of a material that converts a focused laser beam exiting said laser processing head interior and impinging on said beam conversion unit into a wide-band heat beam, said beam conversion unit positioned to emit the wide-band heat beam as a secondary electromagnetic radiation beam in a propagation direction back into said interior and away from said external centering accessory and said beam conversion unit;
a beam reflector disposed in said laser processing head to reflect the secondary electromagnetic radiation beam; and,
a plurality of radiation sensors, said plurality of radiation sensors being located to sense electromagnetic radiation through at least one hole in said interior wall, said plurality of radiation sensors each respectively disposed at a respective axial distance from said beam handling unit, said beam reflector being positioned to reflect the secondary electromagnetic radiation beam for sensing by at least one of said plurality of radiation sensors.

9. A laser processing machine as claimed in claim 8, further comprising:
at least one of said plurality of radiation sensors has a glass pane through which must pass electromagnetic radiation passing through said at least one hole in said interior wall, to said at least one of said plurality of radiation sensors from said laser processing head interior; and,
said glass pane has a coating that exhibits high reflectivity for $CO_2$ laser radiation.

10. A laser processing machine comprising:
a laser processing head, said laser processing head having an interior, said interior having an interior wall, said interior wall being disposed about a central axis;
a nozzle configured to operatively connect to said laser processing head;
a beam handling unit disposed at said at least one nozzle edge, said beam handling unit being made of a material reflecting a focused laser beam at said at least one nozzle opening edge as a secondary electromagnetic radiation beam in a propagation direction back into said laser processing head interior and away from said nozzle opening and said beam handling unit;

a beam reflector disposed in said laser processing head to reflect the secondary electromagnetic radiation beam; and, a radiation detector, said radiation detector being located to directly sense secondary electromagnetic radiation of said secondary electromagnetic radiation beam through at least one hole in said interior wall, said radiation detector being disposed at a respective axial distance from said beam handling unit, said beam reflector being positioned to reflect the secondary electromagnetic radiation beam for sensing by said radiation detector.

11. A laser processing machine as claimed in claim 10, further comprising:

a focusing lens in said laser processing head, said radiation detector being disposed on an opposite of said focusing lens relative to said nozzle.

12. The laser processing machine as claimed in claim 10, wherein:

said radiation detector is a thermopile.

13. The laser processing machine as claimed in claim 10, wherein:

said radiation detector is an infrared detector configured to detect $CO_2$ radiation.

14. A process for aligning a focused laser beam comprising the steps of:

starting a laser work beam at a previously-recorded center location;

running the laser work beam towards a beam handling unit and a nozzle edge in a first direction;

sensing a secondary electromagnetic radiation beam by a sensor to indicate contact of the laser work beam with the beam handling unit;

saving the beam coordinates after said step of sensing a secondary electromagnetic radiation beam by a sensor to indicate contact of the laser work beam with the beam handling unit;

running the laser work beam at least two more times towards the beam handling unit and the nozzle edge in at least two additional directions to the first direction and saving corresponding beam coordinates;

calculating with the saved beam coordinates a new center location of the laser work beam in a nozzle; and, effecting a relative displacement of the nozzle center relative to the center of the laser work beam to mutually align their centers in the new center location calculated.

15. A process for aligning a focused laser beam as claimed in claim 14 further comprising the steps of:

providing the beam handling unit as a conversion ring; and, converting at least a portion of the laser work beam into a secondary electromagnetic radiation beam that is a wide-band heat beam emitted in propagation direction towards a beam reflector.

16. The process for aligning a focused laser beam as claimed in claim 15 wherein:

the step of providing the beam handling unit as a conversion ring includes the provision of a sapphire ring.

17. A process for aligning a focused laser beam as claimed in claim 16 further comprising the step of:

providing reflection coating as a gold coating on the sapphire ring.

18. A process for aligning a focused laser beam as claimed in claim 14 further comprising the step of:

reflecting at least a portion of the laser work beam as a secondary electronic radiation beam in propagation direction towards a beam reflector.

19. A process for aligning a focused laser beam as claimed in claim 14 further comprising the step of:

using successive nozzle-to-beam centering measurements to determine the axial position of the focus of the laser work beam.

20. A process for aligning a focused laser beam as claimed in claim 19 further comprising the steps of:

carrying out said step of using successive nozzle-to-beam centering measurements to determine the axial position of the focus of the laser work beam, at various laser powers to measure laser-induced thermal axial focus offset; and, correlating the measured laser-induced thermal axial focus offset to quality of the focusing lens, or to quality of the optical elements along the optical path, or to both the quality of the focusing lens and the quality of the optical elements along the optical path.

\* \* \* \* \*